US007675588B2

United States Patent
Ko et al.

(12) United States Patent
(10) Patent No.: US 7,675,588 B2
(45) Date of Patent: Mar. 9, 2010

(54) SYSTEM FOR DISPLAYING IMAGES INCLUDING A LIQUID CRYSTAL DISPLAY PANEL

(75) Inventors: Chi-Mo Ko, Hemei Township (TW); Chao-Yin Lin, Sindian (TW); Ching-Yu Chang, Su-Ao Township (TW); Li-Sen Chuang, Jhubei (TW); Chia-Ching Chu, Yonghe (TW)

(73) Assignee: TPO Displays Corp. (TW)

( * ) Notice: Subject to any disclaimer, the term of this patent is extended or adjusted under 35 U.S.C. 154(b) by 65 days.

(21) Appl. No.: 11/987,074

(22) Filed: Nov. 27, 2007

(65) Prior Publication Data
US 2008/0123029 A1 May 29, 2008

(30) Foreign Application Priority Data
Nov. 27, 2006 (TW) .............................. 95143714 A

(51) Int. Cl.
*G02F 1/1335* (2006.01)

(52) U.S. Cl. .................. 349/96; 349/106; 349/139; 349/179

(58) Field of Classification Search .................. 349/96, 349/106, 139, 179
See application file for complete search history.

(56) References Cited
OTHER PUBLICATIONS
US 6,642,798, 11/2003, Zachan et al. (withdrawn)*

* cited by examiner

*Primary Examiner*—Frank G Font
*Assistant Examiner*—Michael P Mooney
(74) *Attorney, Agent, or Firm*—Raymond J. Ho; Morris Manning & Martin

(57) ABSTRACT

A system for displaying images includes a liquid crystal display panel. The liquid crystal display panel comprises a color filter substrate having a light shielding layer on a peripheral area and a common electrode on a display area and the peripheral area, and an array substrate having a pixel electrode on the display area and a separate and independent electrode with a fixed voltage on the peripheral area. The liquid crystal display panel further comprises a liquid crystal layer between the color filter substrate and the array substrate.

17 Claims, 4 Drawing Sheets

SYSTEM FOR DISPLAYING IMAGES INCLUDING A LIQUID CRYSTAL DISPLAY PANEL

FIELD OF THE INVENTION

The invention relates to a liquid crystal display panel, and more particularly to a peripheral area of the liquid crystal display panel with enhancing equivalent optical density by an electronic controlling method.

DESCRIPTION OF THE RELATED ART

Recently, the liquid crystal display has been applied widely to the display element of various products such as desktop computers, televisions, digital watches, telephones, beepers, mobile phones, electronic calculators and the like. Referring to FIG. 1, it is a cross section of a conventional liquid crystal display 100 having a display area 102 and a peripheral area 104. An upper substrate 101 has a color filter (not shown), a common electrode 103 and a black matrix 105 thereon, wherein the black matrix 105 is disposed on the peripheral area surrounding the display area. A lower substrate 109 has a thin-film transistor (TFT) (not shown) and a pixel electrode 107 thereon. A liquid crystal layer 110 is disposed between the upper substrate 101 and the lower substrate 109. In addition, the liquid crystal display 100 further comprises a pair of polarizers (not shown) sandwiching the upper substrate 101 and the lower substrate 109, and a backlight device (not shown) disposed under the lower polarizer.

When a voltage is applied to the common electrode 103 and the pixel electrode 107 of the conventional liquid crystal display, for example, a normally white twisted nematic liquid crystal display, the liquid crystal molecules in the display area 102 are changed from a lying state 114 to a vertical state 112 by an up-and-down electric field effect. The light from the backlight device first pass the lower polarizer, and then pass the vertical liquid crystal molecules 112 but do not pass the upper polarizer such that the display area 102 exhibits a dark state. On the contrary, the liquid crystal molecules in the peripheral area 104 are not affected by the electric field such that they keep the lying state 114. When the light from the backlight device pass the lower polarizer and then pass the lying liquid crystal molecules 114, it can pass through the upper polarizer to make the peripheral area 104 exhibit a bright state.

Referring to FIG. 2, it is a top view of the conventional liquid crystal display 100. As the above, when a voltage is applied to the liquid crystal display 100, the central display area 102 exhibits the dark state and the peripheral area 104 exhibits the bright state. The border between the display area and the peripheral area produces a light leakage even through the peripheral area has the light-shielding black matrix thereon. Therefore, the display quality of the conventional liquid crystal display is low.

The light transmission passing the pixels of the liquid crystal display is reduced with the resolution thereof increasing. When the display is at the dark state, the brightness at the border of the peripheral back matrix area is higher than the brightness of the central display area. Therefore, the light leakage at the peripheral area is serious and the brightness difference of the border between the display area and the peripheral area is more apparent when backlight brightness is enhanced.

Therefore, a liquid crystal display panel that can overcome the light leakage as above is desirable to achieve a better display quality.

BRIEF SUMMARY OF THE INVENTION

The invention utilizes an electronic controlling method to enhance an equivalent optical density (OD) of a peripheral area of a display panel and to overcome a light leakage thereof.

The invention provides a system for displaying images. An exemplary embodiment of such as system comprises a liquid crystal display panel and a pair of polarizers sandwiching the liquid crystal display panel, wherein the liquid crystal display panel has a display area and a peripheral area surrounding the display area. The liquid crystal display panel comprises a first substrate having a common electrode at the display area and the peripheral area. A light-shielding layer is disposed at the peripheral area. A second substrate has a pixel electrode at the display area and a separate electrode independent of the pixel electrode and at the peripheral area, wherein the separate electrode is controlled by a constant voltage. A liquid crystal layer is disposed between the first and the second substrates.

An exemplary liquid crystal display panel of the invention uses the constant voltage to control the separate electrode and operates with the common electrode. A plurality of liquid crystal molecules at the peripheral area of the liquid crystal display panel are controlled by the electronic controlling method such that the light leakage at the peripheral area can be reduced.

A detailed description is given in the following embodiments with reference to the accompanying drawings.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. The description is provided for illustrating the general principles of the invention and is not meant to be limiting. The scope of the invention is best determined by reference to the appended claims.

The invention utilizes an electronic controlling method to enhance an equivalent optical density (OD) of a peripheral area of a display panel such that a light leakage thereof can be eliminated.

Figure 1:
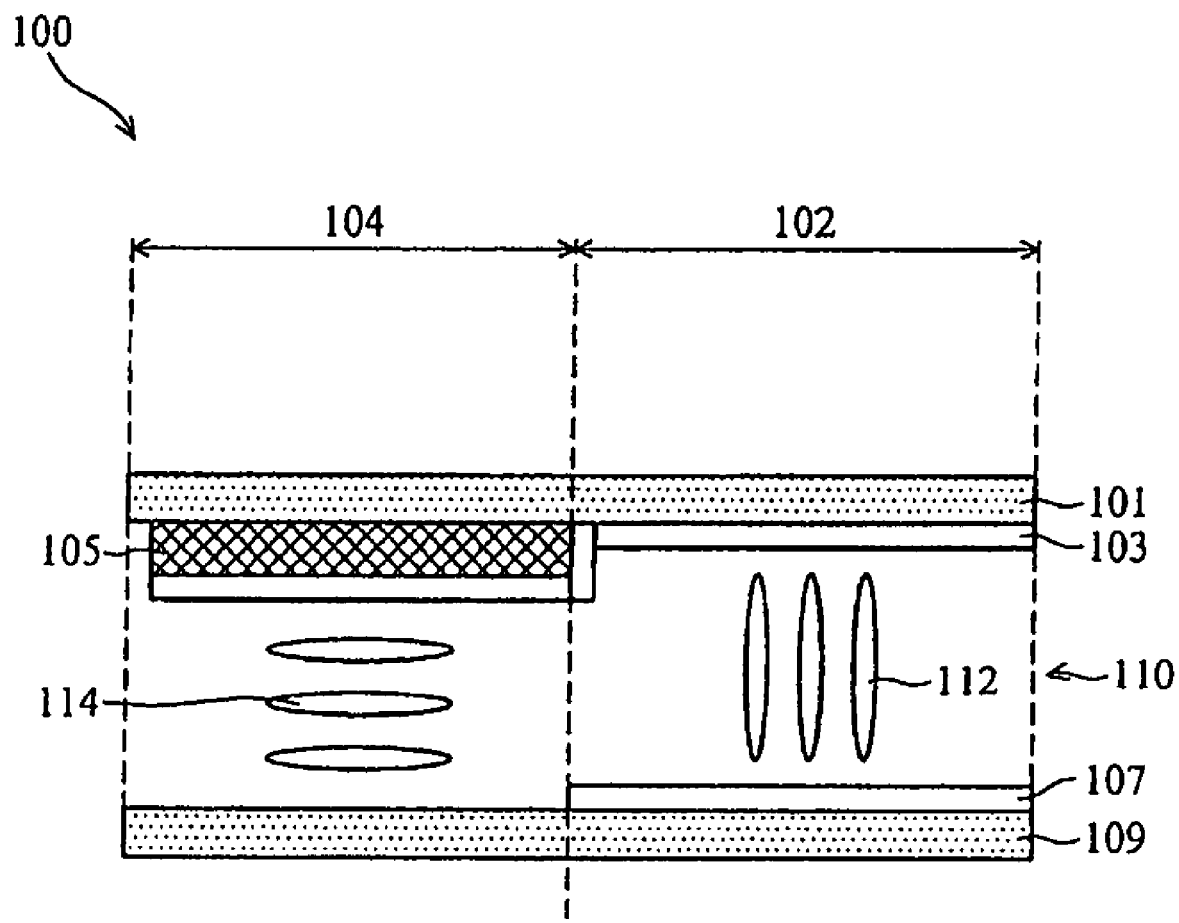
FIG. 1 is a schematic cross section of a conventional liquid crystal display.
Figure 2:
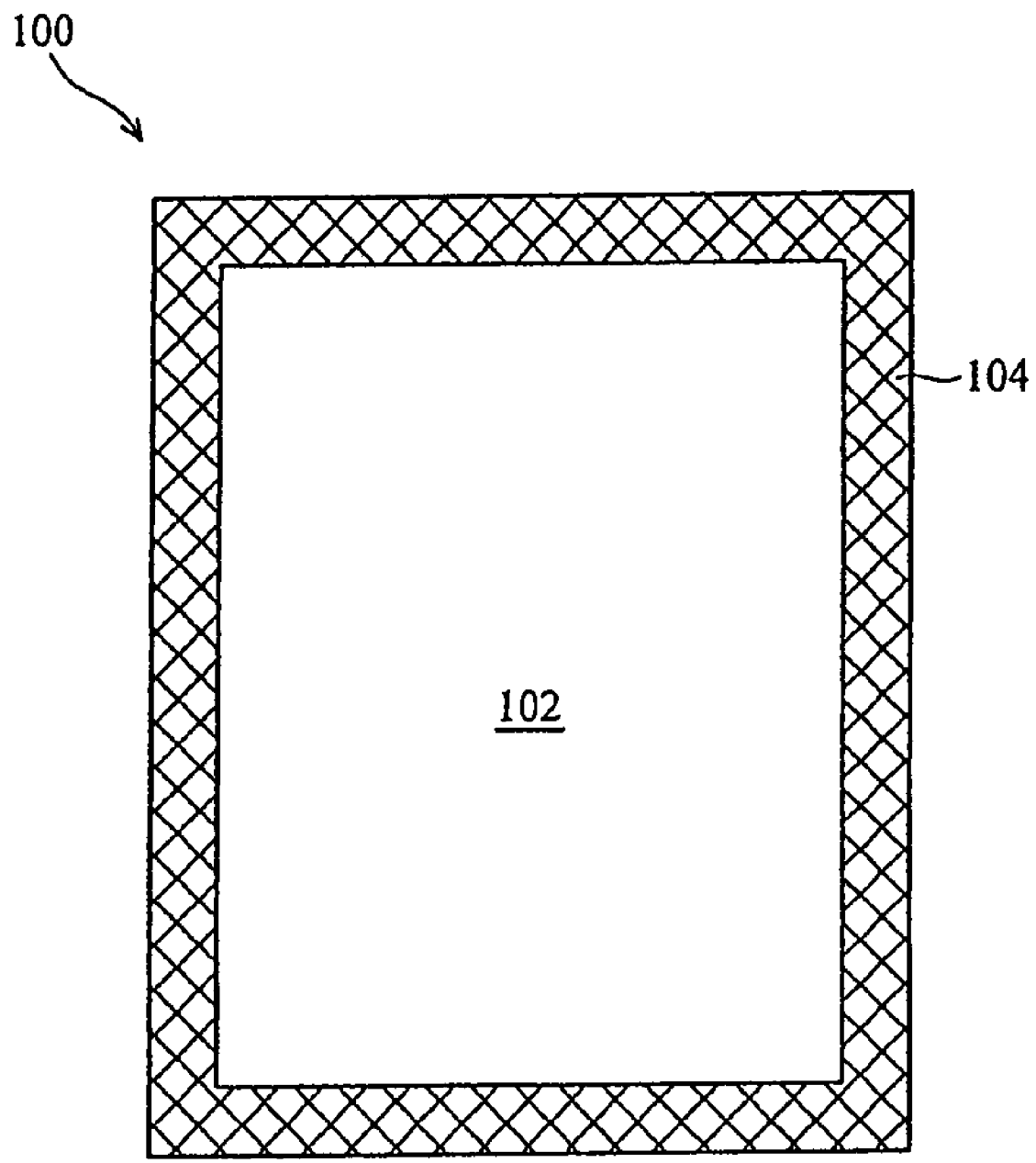
FIG. 2 is a schematic top view of a conventional liquid crystal display.
Figure 3A:
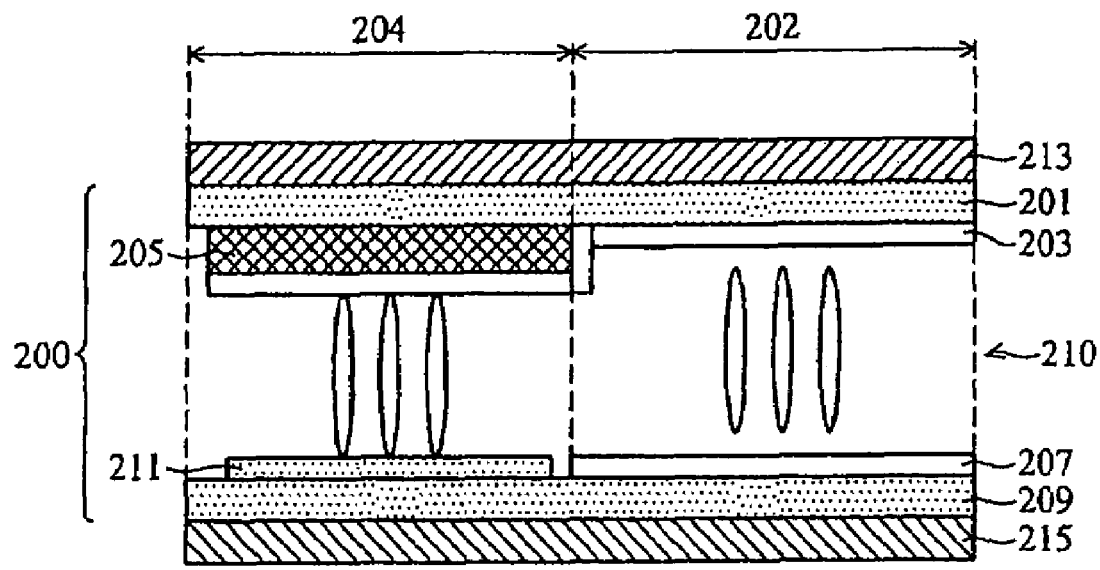
FIG. 3A is a schematic cross section of a liquid crystal display panel according to an embodiment of the invention.

FIG. 3A shows a cross section of a liquid crystal display panel 200 of an embodiment of the invention. The liquid crystal display panel 200 has a display area 202 and a peripheral area 204, wherein the peripheral area 204 surrounds the display area 202 (not shown). The liquid crystal display panel 200 further comprises a color filter substrate 201, an array substrate 209 and a liquid crystal layer 210 disposed between the color filter substrate 201 and the array substrate 209.

The color filter substrate 201 has a color filter structure thereon (not shown), and has a light-shielding layer 205 disposed on the peripheral area 204. The light-shielding layer may be formed from a black matrix material, for example, Cr/CrO, black resin or the like. The color filter substrate 201 further has a common electrode 203 covering the display area 202 and the light-shielding layer 205 of the peripheral area 204. The common electrode 203 may be formed from a transparent conductive material such as ITO, IZO or the like.

The display area 202 of the array substrate 209 has a thin film transistor (TFT) array (not shown) thereon and a pixel electrode 207 covering the display area. The pixel electrode 207 can be formed from a transparent conductive material such as ITO, IZO or the like. According to one embodiment of the invention, a separate electrode 211 independent of the pixel electrode 207 is disposed on the peripheral area of the array substrate 209 corresponding to the light-shielding layer 205 of the color filter substrate. The separate electrode 211 can be formed from a transparent conductive material or a metal, with metal preferred for better light-shielding effect.

Figure 3B:
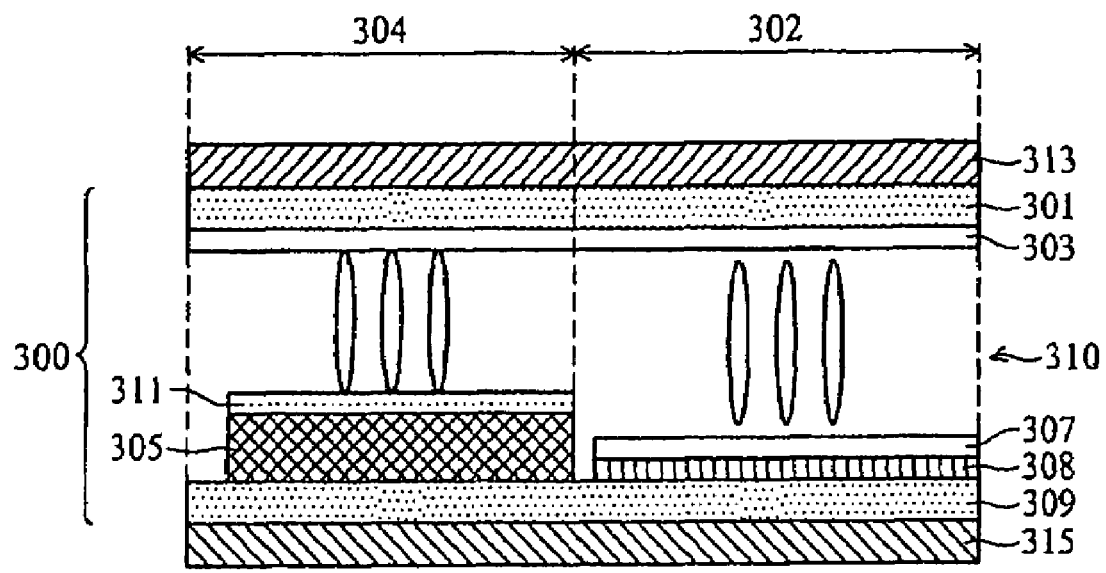
FIG. 3B is a schematic cross section of the liquid crystal display panel according to another embodiment of the invention.

Referring to FIG. 3B, a cross section of a liquid crystal display panel 300 according to another embodiment of the invention, the liquid crystal display panel 300 has a color filter on array (COA) structure. As shown in FIG. 3B, the liquid crystal display panel 300 has a display area 302 and a peripheral area 304, wherein the peripheral area 304 surrounds the display area 302 (not shown). The liquid crystal display panel 300 further comprises an upper substrate 301, an array substrate 309 and a liquid crystal layer 310 disposed between the upper substrate 301 and the array substrate 309.

The upper substrate 301 has a common electrode 303 thereon covering the display area 302 and the peripheral area 304. The upper substrate 301 can be a transparent substrate such as a glass substrate. The common electrode 303 may be formed from a transparent conductive material such as ITO, IZO or the like.

The display area 302 of the array substrate 309 has a thin-film transistor (TFT) array (not shown) thereon. A color filter 308 is disposed on the TFT array and a pixel electrode 307 is disposed covering the color filter 308. The pixel electrode 307 can be formed from a transparent conductive material such as ITO, IZO or the like. In addition, the peripheral area 304 of the array substrate 309 has a light-shielding layer 305 thereon. The light-shielding layer 305 may be formed from a black matrix material such as Cr/CrO, black resin or the like. According to one embodiment of the invention, a separate electrode 311 independent of the pixel electrode 307 is disposed on the light-shielding layer 305. The separate electrode can be formed from a transparent conductive material or a metal, with metal preferred for better light-shielding effect.

Compared with the conventional liquid crystal display panel, the liquid crystal display panel of one embodiment of the invention provides the separate electrode at the peripheral area of the array substrate. Thus, the peripheral areas of the upper substrate and the array substrate both have electrodes thereon irrelevant of whether the light-shielding layer and the color filter are disposed on the upper substrate or the array substrate. The electrode on the peripheral area of the upper substrate is the common electrode extending from the display area to the peripheral area. The electrode on the peripheral area of the array substrate is the separate electrode which can be formed by photolithography technology and independent of the pixel electrode of the display area. The separate electrode is controlled by a constant voltage which can be chosen by the kind of liquid crystal used. The electronic controlling method can be performed by a driving circuit outside the display panel or a circuit inside the display panel to control the separate electrode.

A liquid crystal display, for example, a normally white twisted nematic liquid crystal display (NW TN LCD) further comprises a pair of polarizers sandwiching the liquid crystal display panel of the invention and a backlight device (not shown in Figs.) disposed under the lower polarizer. As shown in FIG. 3A, a pair of polarizers 213 and 215 sandwich the liquid crystal display panel 200. As shown in FIG. 3B, a pair of polarizers 313 and 315 sandwich the liquid crystal display panel 300. The pair of polarizers covers the peripheral area on which the separate electrode is disposed.

Referring to FIGS. 3A and 3B, when a voltage is respectively applied to the common electrode 203, 303 and the pixel electrode 207, 307 and a constant voltage is applied to the separate electrode 211, 311, the liquid crystal molecules 210, 310 of the display area 202, 302 and the peripheral area 204, 304 are changed from a lying state to a vertical state by the up-and-down electric field. The light from the backlight device can pass through the lower polarizer 215, 315 and then pass through the vertical liquid crystal molecules but do not pass through the upper polarizer 213, 313, such that the display area 202, 302 and the peripheral area 204, 304 both exhibit dark states.

In one embodiment of the invention, the liquid crystal display panel, for example, with a black matrix resin of an optical density (OD) of 3.5 and a NW-TN type of a liquid crystal of a contrast of 300, an equivalent optical density of the peripheral area can be calculated by the formula as below:

$$\mathrm{Log}[(1/300)*(10e-3.5)]=5.98$$

The equivalent optical density of the peripheral area is 5.98 as above. The higher the optical density, the lower the light transmission, i.e., the light-shielding effect is better. From the above calculated result, the liquid crystal display panel of the invention can reduce the brightness of the peripheral area more than the conventional liquid crystal display panel. In one embodiment of the invention, the equivalent optical density of the peripheral area is twice the optical density of the black matrix such that it can prevent the peripheral area from light leakage.

The above is illustrated with the NW TN LCD as an example, but it is not limited to, the liquid crystal display panel of the invention also can be used in a normally black (NB) TN LCD.

Figure 4:
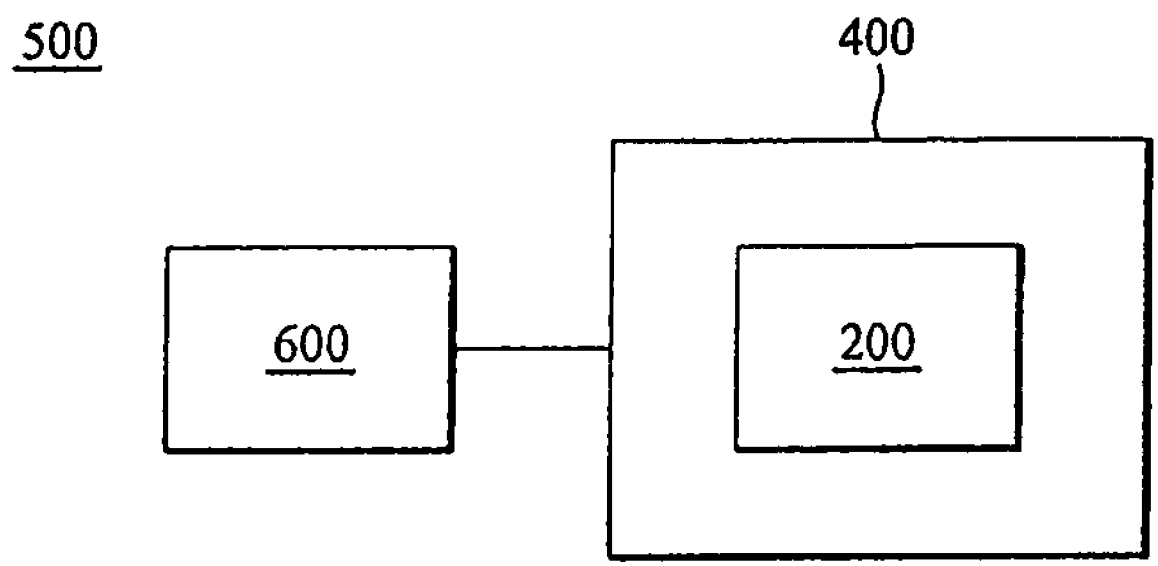
FIG. 4 schematically shows a system for displaying images including the liquid crystal display panel according to an embodiment of the invention.

Referring to FIG. 4, it schematically shows a system 500 for displaying images including the liquid crystal display panel according to an embodiment of the invention. The system comprises a liquid crystal display 400, and the liquid crystal display comprises the liquid crystal display panel 200 shown in FIG. 3A or the liquid crystal display panel 300 shown in FIG. 3B, a pair of polarizers sandwiching the liquid crystal display panel, and a backlight device disposed under the lower polarizer. The liquid crystal display 400 can be a part of an electronic device. In general, the system 500 for displaying images comprises the liquid crystal display 400 and an input unit 600. The input unit 600 is coupled to the liquid crystal display 400 and operative to provide input to the liquid crystal display such that the liquid crystal display displays images. The system 500 for displaying images can be a mobile phone, digital camera, personal data assistant (PDA), notebook computer, desktop computer, television, car display or portable DVD player.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for displaying images, comprising:
a liquid crystal display panel; and
   a pair of polarizers sandwiching the liquid crystal display panel, wherein the liquid crystal display panel has a display area and a peripheral area surrounding the display area, and the liquid crystal display panel comprises:
   a first substrate having a common electrode at the display area and the peripheral area;
   a light-shielding layer disposed at the peripheral area;
   a second substrate having a pixel electrode at the display area and a separate electrode independent of the pixel electrode at the peripheral area, wherein the separate electrode is controlled by a constant voltage; and
   a liquid crystal layer disposed between the first and the second substrates,
   wherein the separate electrode is disposed for corresponding to the light-shielding layer and the light-shielding layer is completely overlapped with the separate electrode.

2. The system as claimed in claim 1, wherein the light-shielding layer is disposed between the first substrate and the common electrode.

3. The system as claimed in claim 2, wherein the first substrate is a color filter substrate and the second substrate is an array substrate.

4. The system as claimed in claim 1, wherein the light-shielding layer is disposed between the second substrate and the separate electrode.

5. The system as claimed in claim 4, further comprising a color filter disposed between the second substrate and the pixel electrode.

6. The system as claimed in claim 5, wherein the second substrate is an array substrate.

7. The system as claimed in claim 1, wherein the pair of polarizers covers the peripheral area on which the separate electrode is disposed.

8. The system as claimed in claim 1, wherein the separate electrode comprises a transparent conductive material.

9. The system as claimed in claim 1, wherein the separate electrode comprises a metal.

10. The system as claimed in claim 1, wherein the separate electrode is controlled by an external circuit outside the liquid crystal display panel.

11. The system as claimed in claim 10, wherein the separate electrode is controlled by a circuit inside the liquid crystal display panel.

12. The system as claimed in claim 1, further comprising a liquid crystal display, wherein the liquid crystal display comprises:
   the liquid crystal display panel;
   the pair of polarizers sandwiching the liquid crystal display panel; and
   a backlight device disposed under the pair of polarizers and the liquid crystal display panel.

13. The system as claimed in claim 12, wherein the liquid crystal display is a normally white twisted nematic liquid crystal display (NW TN LCD).

14. The system as claimed in claim 13, wherein the peripheral area of the liquid crystal display panel exhibits a dark state when the separate electrode is turned on.

15. The system as claimed in claim 14, wherein an equivalent optical density (OD) of the peripheral area is twice an optical density of the light-shielding layer.

16. The system as claimed in claim 12, further comprising an electronic device, wherein the electronic device comprises:
   the liquid crystal display; and
   an input unit coupled to the liquid crystal display to provide input to the liquid crystal display such that the liquid crystal display displays images.

17. The system as claimed in claim 16, wherein the electronic device is a mobile phone, digital camera, personal data assistant (PDA), notebook computer, desktop computer, television, car display or portable DVD player.

* * * * *